United States Patent
Sloane et al.

(10) Patent No.: US 11,720,602 B2
(45) Date of Patent: Aug. 8, 2023

(54) SYSTEMS AND METHODS PROVIDING STREAMLINED DATA CORRELATION IN EDGE COMPUTING

(71) Applicant: BANK OF AMERICA CORPORATION, Charlotte, NC (US)

(72) Inventors: Brandon Sloane, Indian Land, SC (US); John Howard Kling, Cincinnati, OH (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 107 days.

(21) Appl. No.: 17/315,583

(22) Filed: May 10, 2021

(65) Prior Publication Data
US 2022/0358148 A1 Nov. 10, 2022

(51) Int. Cl.
*G06F 16/00* (2019.01)
*G06F 16/28* (2019.01)
*G06F 16/23* (2019.01)

(52) U.S. Cl.
CPC ........ *G06F 16/285* (2019.01); *G06F 16/2379* (2019.01)

(58) Field of Classification Search
None
See application file for complete search history.

(56) References Cited

U.S. PATENT DOCUMENTS

| | | | |
|---|---|---|---|
| 8,447,854 B1 * | 5/2013 | Jasinskyj | H04L 67/289 709/224 |
| 9,876,851 B2 | 1/2018 | Chandramouli et al. | |
| 10,007,513 B2 | 6/2018 | Malladi et al. | |
| 10,230,798 B2 | 3/2019 | Doraiswamy et al. | |
| 10,379,842 B2 | 8/2019 | Malladi et al. | |
| 10,439,820 B2 | 10/2019 | Egner et al. | |
| 10,452,824 B2 | 10/2019 | Egner et al. | |
| 10,470,192 B2 | 11/2019 | Fang et al. | |
| 10,484,451 B2 | 11/2019 | Rao et al. | |
| 10,567,291 B2 | 2/2020 | Sabella et al. | |
| 10,567,495 B2 | 2/2020 | Gandhi et al. | |
| 10,587,721 B2 | 3/2020 | Das et al. | |
| 10,673,871 B2 | 6/2020 | Storms et al. | |
| 10,739,761 B2 | 8/2020 | Chavez et al. | |
| 10,959,039 B2 | 3/2021 | Young et al. | |
| 11,036,536 B2 | 6/2021 | Wang | |
| 11,050,813 B2 | 6/2021 | Sabella et al. | |
| 2016/0301561 A1 * | 10/2016 | Petersen | G06F 11/3495 |
| 2019/0045409 A1 | 2/2019 | Rasanen et al. | |

(Continued)

*Primary Examiner* — Anhtai V Tran
(74) *Attorney, Agent, or Firm* — Moore & Van Allen PLLC; Nicholas C. Russell

(57) ABSTRACT

Embodiments of the present invention provide a system for analyzing and correlating layered electronic data logs for monitored events on a network. The system is configured for identifying one or more entity resources associated with an entity, continuously monitoring the one or more entity resources, identifying at least a first event and a second event associated with at least one entity resource of the one or more entity resources, and performing a correlation analysis at the entity resource prior to transferring the data to a centralized data lake. In this way, the system streamlines the process for correlative analysis by performing resource heavy analysis at the edge of the network and later consolidating such data for further review.

17 Claims, 5 Drawing Sheets

(56) References Cited

U.S. PATENT DOCUMENTS

2019/0138934 A1 5/2019 Prakash et al.
2019/0158606 A1 5/2019 Guim Bernat et al.
2019/0220703 A1 7/2019 Prakash et al.

* cited by examiner

SYSTEMS AND METHODS PROVIDING STREAMLINED DATA CORRELATION IN EDGE COMPUTING

BACKGROUND

Conventional systems do not have the capability to effectively monitor one or more entity resources, log the monitored information, and efficiently correlate logged events in a manner which reduces the processing load on a centralized database. As such, there exists a need for a system that can effectively monitor the one or more entity resources, generate electronic data logs for one or more events on a network, and streamline the process of correlating event data in a manner which disperses the processing load among the resources connected to the network.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for monitoring the one or more entity resources, generating electronic data logs for one or more events on a network, and streamlining the process of correlating event data in a manner which disperses the processing load among the resources connected to the network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more entity resources associated with an entity, continuously monitors stored data on one or more entity resources; identifies at least a first event and a second event associated with at least one entity resource of the one or more entity resources; stores the first event and the second event in at least a first log and a second log; based on metadata of the first event and the second event, correlates the first event and second event to generate a correlated event log; and transmits the correlated event log to one or more upstream entity resources.

In some embodiments, the present invention is further configured to correlate the first event and second event via use of a dedicated processing device located on the at least one entity resource of the one or more entity resources.

In some embodiments, the present invention is further configured to receive multiple correlated event logs on an upstream entity resource; and perform a meta-correlation of the correlated event logs to generate an upstream correlated event log.

In some embodiments, the upstream correlated event log is generated via use of a dedicated processing device located on the upstream entity resource.

In some embodiments, the present invention is further configured to receive multiple correlated event logs and upstream correlates event logs at a single centralized database. In some embodiments, the present invention is further is configured to create at least a third log to record activities associated with the first log and the second log.

In some embodiments, at least one of the first event and the second event is a high exposure event or resource error.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
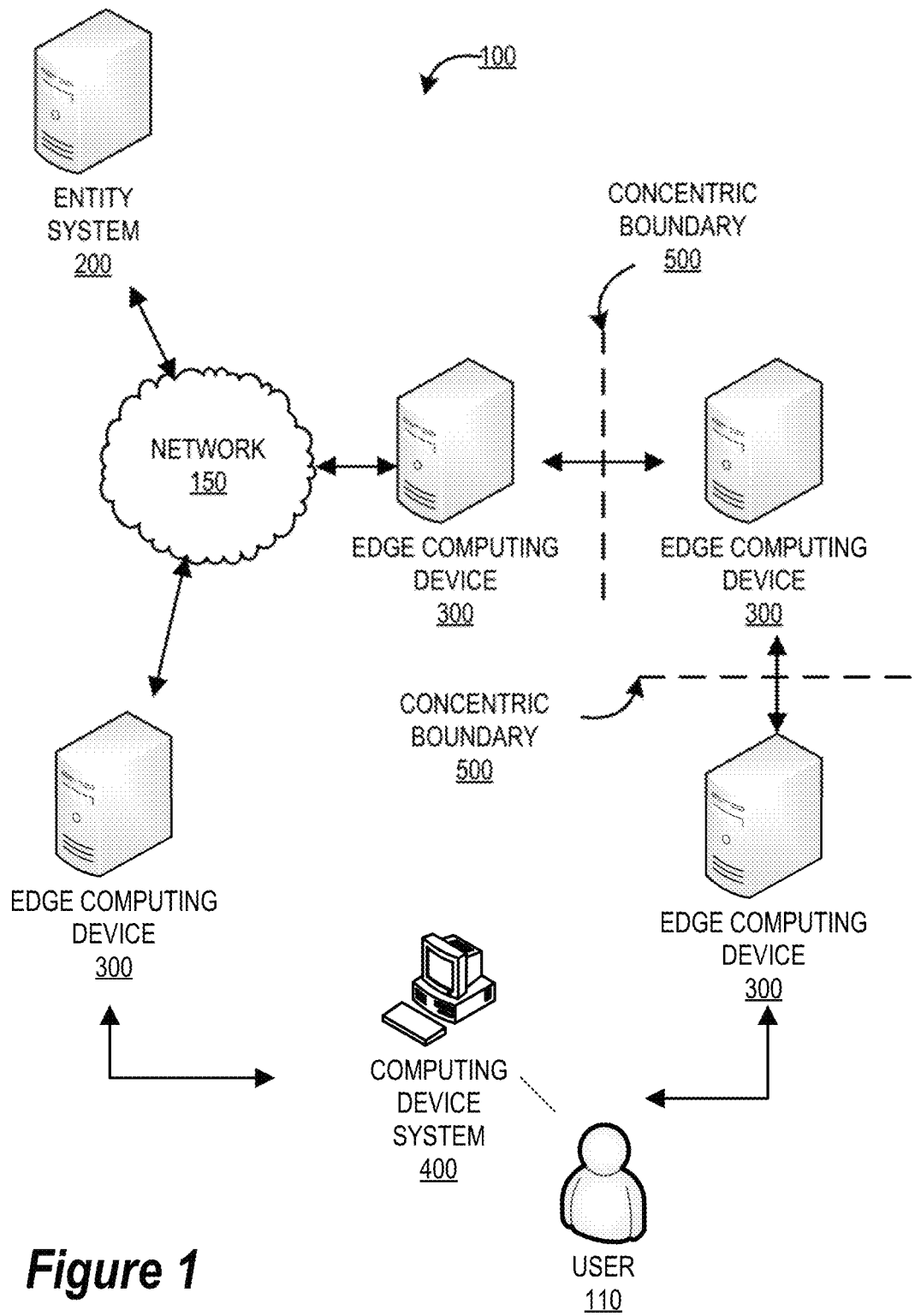
Figure 2:
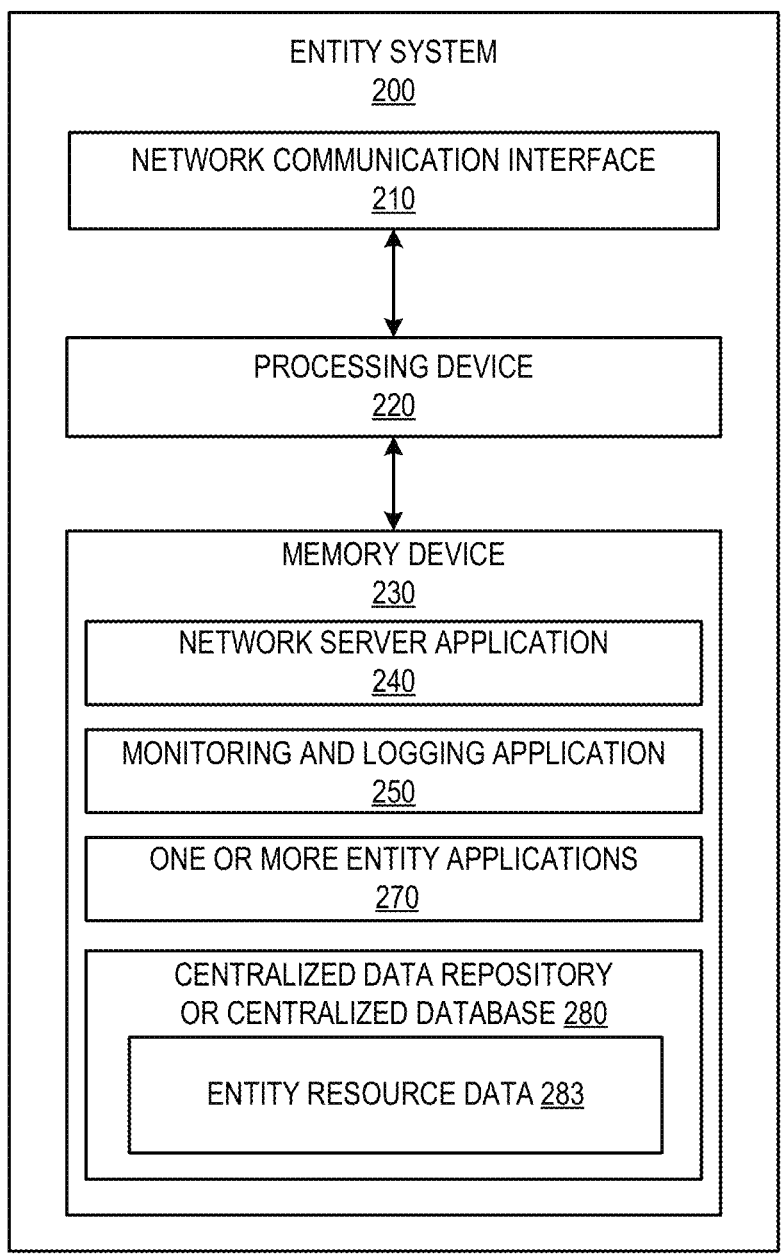
Figure 3:
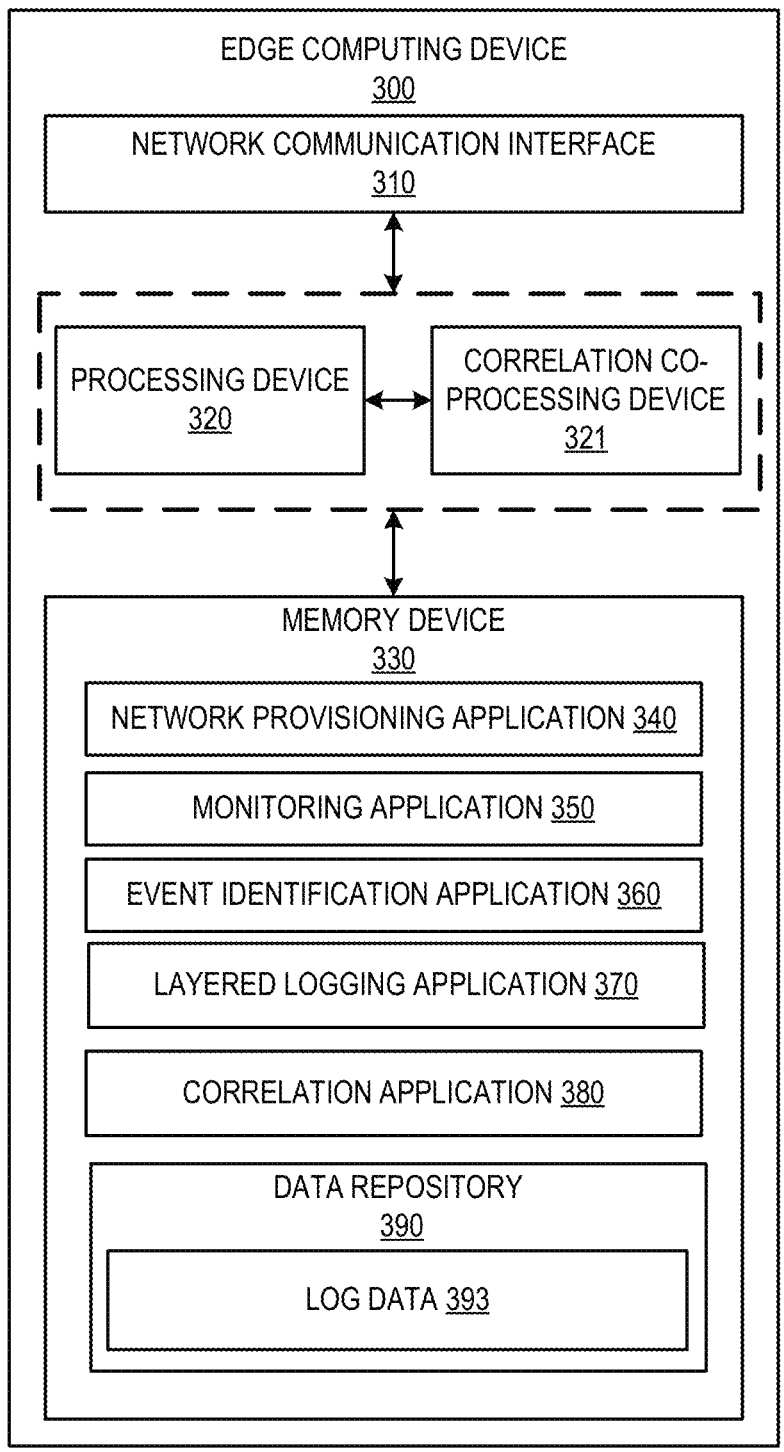
Figure 4:
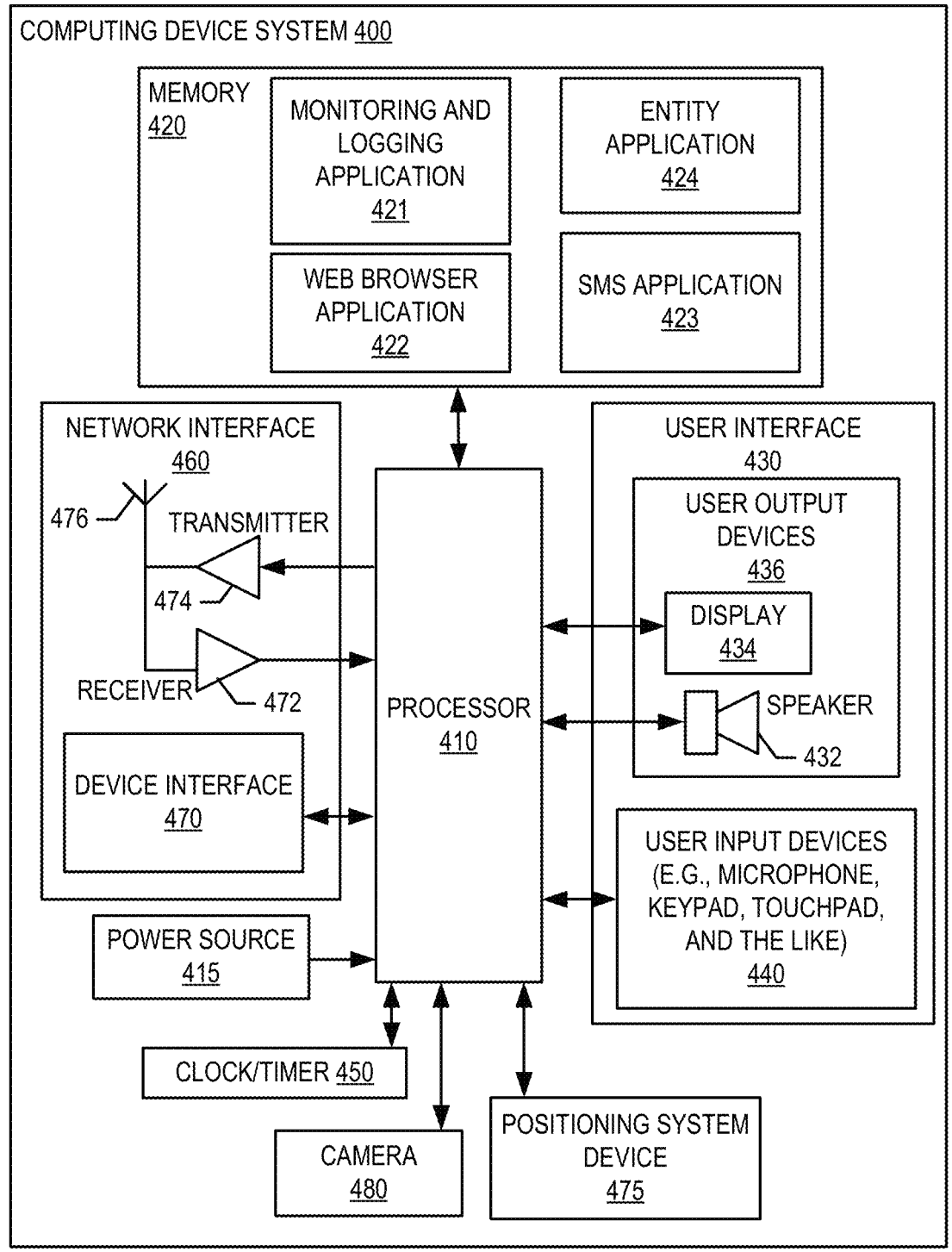
Figure 5:
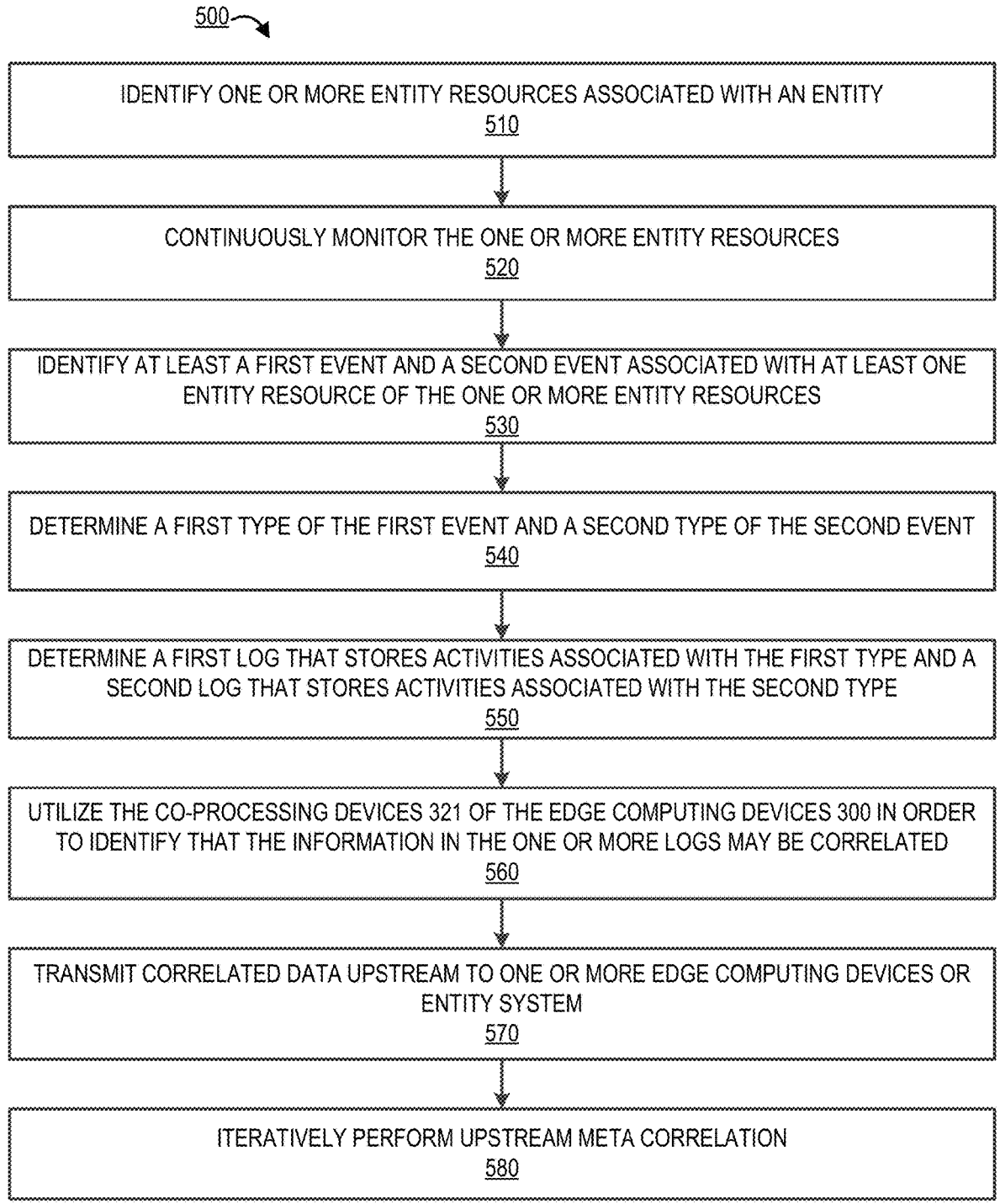

Having thus described embodiments of the invention in general terms, reference will now be made the accompanying drawings, wherein:

FIG. 1 provides a block diagram illustrating a system environment for providing streamlined data correlation in edge computing, in accordance with an embodiment of the invention;

FIG. 2 provides a block diagram illustrating the entity system 200 of FIG. 1, in accordance with an embodiment of the invention;

FIG. 3 provides a block diagram illustrating an edge computing device 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for streamlined data correlation in edge computing, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity "resources," such resources including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications. Applications as described herein may be any software applications configured to perform one or more operations of the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, correlation of logged events across a network of entity resources is generated once data has been collected from the various resources and stored in a centralized database of information. As such, in conventional systems, data correlation and pattern recognition (e.g., identification of network issues, security issues, storage issues, application issues, attempted malfeasant user activity, or the like) may place a heavy processing load on centralized systems, wherein they may be tasked with parsing, categorizing, analyzing, and correlating a large amount of data at various levels of detail or abstraction, and associated metadata from numerous resources must be normalized and accounted for. As such, there exists a need for a system that enables one or more entity resources to perform part or all of this process at the edge of the network, or in other words, at the resources themselves, such that by the time data is received and aggregated at the centralized database, a majority or all of the correlation data has already been processed to the extent possible. In addition, the system described herein may perform additional processing and higher level correlation as the data moves inward toward the central database of information. The result is that the entity resource data stored in a centralized data repository has been pre-processed to identify data and metadata correlations, and the processing device of the centralized database may only be tasked with identifying correlations and patterns at a higher level of extrapolation, thereby distributing the processing load amongst the network of resources and creating a more efficient system overall.

FIG. 1 provides a block diagram illustrating a system environment for providing streamlined data correlation in edge computing, in accordance with an embodiment of the invention. As illustrated in FIG. 1, the environment 100 includes one or more edge computing device(s) 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., exposure analysts, application developers, application owners, application end users, business analysts, finance agents, brokers, customers, or the like) of an entity associated with the entity system 200, which interact with the various computing systems of the system environment 100.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities. Resources may include the edge computing device(s) 300, which are systems of the present invention for performing one or more process steps described herein. In some embodiments, the edge computing device(s) 300 may be independent systems. In some embodiments, the edge computing device(s) 300 may be considered a sub-part of the entity system 200. The system environment typically includes numerous edge computing devices 300, as depicted in FIG. 1, each of which may be considered an "edge" system with respect to the concentric boundaries 500 visualized as separating each edge computing device 300 as one or more data hops between the central network and the edge computing device(s) 300 takes place. It is understood that the concentric boundaries 500 may not be actual boundaries, but rather visual depictions of layers of distance between each respective edge computing device 300 and the entity system 200.

For instance, as shown in the bottom left hand region of FIG. 1, data gathered from computing device system 400 may be collected by an edge computing device 300, processed by the edge computing device 300, and transmitted over the network 150 to the entity system 200. In other embodiments, data may be processed by multiple edge computing devices 300 before reaching the entity system 200. While only two data paths from the computing device system 400 are shown, it is understood that any number of paths may exist over any number of edge computing devices 300, wherein the edge computing devices 300 are delineated by concentric boundaries 500 which correlate with the number of systems between a data source and a centralized datastore of entity system 200. If the system environment 100 were to be depicted with a high degree of radial symmetry, the concentric boundaries 500 would demarcate concentric boundaries of separation between the entity system 200 and each respective layer of edge computing device 300. As such, as discussed in more detail with regard to FIG. 3, the each edge computing device 300 may perform its own pre-processing of data and metadata in order to identify correlations and patterns as the data is further consolidated and transferred throughout the system environment 100, reducing the load on the next-closest system to entity system 200 in terms of concentric boundary 500.

The edge computing device 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the edge computing device 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the edge computing device 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a monitoring and logging application 250, one or more entity applications 270, and a centralized data repository 280 (also referred to as a centralized database, centralized data lake, centralized data link, or the like) comprising information associated with entity resource data 283. The one or more entity applications 270 may be any applications developed, supported, maintained, utilized, and/or controlled by the entity. Entity resource data 283 may comprise any data associated with the one or more entity resources of the entity, such as edge computing device(s) 300 or connected computing device system(s) 400. The computer-executable program code of the network server application 240, the monitoring and logging application 250, the one or more entity application 270 to perform certain logic, data-extraction, and data-storing functions of the entity system 200 described herein, as well as communication functions of the entity system 200 over network 150.

The network server application 240, the monitoring and logging application 250, and the one or more entity applications 270 are configured to store data in the centralized data repository 280 or to use the data stored in the centralized data repository 280 when communicating through the network communication interface 210 with the edge computing device 300, and/or the computing device system 400 to perform one or more process steps described herein. In some embodiments, the entity system 200 may receive instructions from the edge computing device 300 via the monitoring and logging application 250 to perform certain operations. The monitoring and logging application 250 may be provided by the edge computing device 300. The one or more entity applications 270 may be any of the applications used, created, modified, facilitated, and/or managed by the entity system 200.

FIG. 3 provides a block diagram illustrating the edge computing device 300 in greater detail, in accordance with embodiments of the invention. As illustrated in FIG. 3, in one embodiment of the invention, the edge computing device 300 includes one or more processing devices 320 and correlation co-processing devices 321 operatively coupled to a network communication interface 310 and a memory device 330. In certain embodiments, the edge computing device 300 is operated by an entity, such as a financial institution. In some embodiments, the edge computing device 300 is owned or operated by the entity of the entity system 200. In some embodiments, the edge computing device 300 may be an independent system. In alternate embodiments, the edge computing device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the edge computing device 300 described herein. For example, in one embodiment of the edge computing device 300, the memory device 330 includes, but is not limited to, a network provisioning application 340, a monitoring application 350, an event identification application 360, a layered logging application 370, a correlation application 380, and a data repository 390 comprising log data 393 and any other data processed or accessed by one or more applications in the memory device 330. The computer-executable program code of the network provisioning application 340, the monitoring application 350, the event identification application 360, the layered logging application 370, and the correlation application 380 may instruct the processing device 320 to perform certain logic, data-processing, and data-storing functions of the edge computing device 300 described herein, as well as communication functions of the edge computing device 300.

The network provisioning application 340, the monitoring application 350, the event identification application 360, the layered logging application 370, and the correlation application 380 are configured to invoke or use the data in the data repository 390 when communicating through the network communication interface 310 with the entity system 200, and/or the computing device system 400. In some embodiments, the network provisioning application 340, the monitoring application 350, the event identification application 360, the layered logging application 370, and the correlation application 380 may store the data extracted or received from the entity system 200, and the computing device system 400 in the data repository 390. In some embodiments, the network provisioning application 340, the monitoring application 350, the event identification application 360, the layered logging application 370, and the correlation application 380 may be a part of a single application. The functionalities of the network provisioning application 340, the monitoring application 350, the event identification application 360, and the correlation application 380 are explained in greater detail in FIG. 5.

It is also noted that the processing requirements of the correlation application 380 may be assigned to the correlation co-processing device 321. In some embodiments, this may be a graphics-based co-processor, hardware component, application plug-in, or the like which is tasked solely with the processing load related to the needs of the correlation application 380. For instance, the correlation co-processing device 321 may be tasked with identifying similarities between data streams, or identifying certain patterns in the metadata characteristics associated with one or more files stored in the data repository 390. For example, the edge computing device 300 may recognize that certain data files contain a cryptographic hash, recognizing that the edge computing device is receiving encrypted data which is sensitive in nature and will require decryption, verification, or further authentication in order to access, and log the data as being associated with an encryption event.

In other embodiments, the edge computing device 300 may analyze the data from the data repository and identify that a transaction from a specific user account was initiated at or near the time of the encryption event, and log this data as a transaction event. In correlating the two event logs, the edge computing device 300 may package the correlated data in a single log before passing the data across a concentric boundary 500 to a further edge computing device 300, or before transmitting the data over the network 150 to the entity system 200. In this way, not only is the edge computing device 300 reducing the processing load on upstream systems and devices, but allows the upstream systems to perform a layered correlation at a higher level of extrapolation. For instance, two previously correlated data logs from downstream edge computing devices 300 may be further correlated by an upstream edge computing device 300, or by entity system 200, in order to further resolve data patterns and related events. Additionally, by nature of the co-processing device 321 having a separate and distinct task of correlating data events, the CPU, memory, and power demands of the correlation co-processing device 321 may be accounted for separately, and reduce the periodic strain on the processing device 320 which handles the other processing tasks of the edge computing device 300 during times where highly correlated events require a relatively higher amount of processing power and compute resources.

FIG. 4 provides a block diagram illustrating a computing device system 400 of FIG. 1 in more detail, in accordance with embodiments of the invention. However, it should be understood that FIG. 4 is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an monitoring and logging application 421, entity application 424. These applications also typically instructions to a graphical user interface (GUI) on the display 430 that allows the user 110 to interact with the entity system 200, the edge computing device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the monitoring and logging application 421 provided by the edge computing device 300 allows the user 110 to access the edge computing device 300. In some embodiments, the entity application 424 provided by the entity system 200 and the monitoring and logging application 421 allow the user 110 to access the functionalities provided by the edge computing device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for generating duplicate layered electronic data logs for monitored events on a network, in accordance with an embodiment of the invention. As shown in block 510, the system identifies one or more entity resources associated with an entity, such as edge computing device(s) 300. One or more resources associated with an entity may be any entity systems, servers, repositories, databases, applications, or the like. As shown in block 520, the system continuously monitors the one or more entity resources. In some embodiments, the system may continuously track activity associated with each of the one or more entity resources (e.g., a user accessing an entity resource, performing a transaction, executing a cryptographic encryption function, or the like).

As shown in block 530, the system identifies at least a first event and a second event associated with at least one entity resource of the one or more entity resources. Upon continuously monitoring the one or more entity resources, the system may identify occurrence of one or more events. In some embodiments, events associated with the one or more entity resources may be normal activities (e.g., a user accessing an entity resource, performing a transaction, executing a cryptographic function, or the like). In some embodiments, at least one of the events associated with the one or more entity resources may be high exposure events (e.g., unauthorized access, authorized encryption, malicious software modifying contents associated with the one or more entity resources, or the like).

As shown in block 540, the system determines a first type of the first event and a second type of the second event. For example, the system may determine that the first event is associated with a user accessing/logging into a first entity system and may identify that the event is a logging activity. Upon determining that the first event is a logging activity, the system may determine an access log that stores information associated with logging events.

As shown in block 550, the system determines a first log that stores activities associated with the first type and a second log that stores activities associated with the second type. In one example, first event may be logging activity as explained in the previous example and the second event may be associated with a processor computing a cryptographic function. The system identifies that the processor is computing the cryptographic function and may identify that the second event is an encryption event. Upon identifying the encryption activity, the system may determine an encryption log that records all encryption activities associated with the one or more entity resources. The system stores the first event in the first log and the second event in the second log. Continuing with the previous examples, the system stores the first event in an access log and the second event in an encryption log.

At this point, as shown in block 560 the system may utilize the co-processing devices 321 of the edge computing devices 300 in order to identify that the information in the one or more logs may be correlated to identify a sequence of activities. Continuing with the previous example, the information in both the first log and the second log may be correlated to identify that a user has logged in to perform a transaction and that a cryptographic function was also executed to secure the transaction. It is understood that various correlations between multiple varieties of data logs may occur. For instance, data generated on one or more edge computing devices 300, as opposed to data received from computing devices 400, may also be logged, analyzed, and correlated according to specific characteristics in order to infer events or conditions of the overall system. For instance, one or more edge computing devices 300 may be processing a specific type of data, such as transaction data, communication data, or the like, and the particular data processing, or particular application used to process the data, may be correlated with another temporal event, such as an error, a duplicative or redundant process, or the like. By correlating the specific type of data or specific data files processed which are correlated with abnormal events, the system may locate the potential source of an issue, inefficiency, incompatibility, or the like, which can be passed upstream to devices and administrators that can further investigate the issue.

As shown in block 570, the system may transmit correlated data upstream to one or more additional edge computing device(s) 300, or to entity system 200. As discussed, the processing of correlative analysis taking place on downstream edge devices allows upstream devices to operate more efficiently. In some embodiments, the upstream devices (e.g., one or more additional edge computing devices 300 or entity system 200), may receive data from multiple downstream resources. For the upstream devices, by nature of access to a broader or larger dataset versus downstream devices, the upstream devices may perform their own iterative meta-correlations, as shown in block 580. For instance, a first edge computing device 300 may correlate two data points or logged events in order to infer that a specific event has occurred (e.g., a specific type of encryption caused Application X to stall or demand an abnormal amount of resources). The first edge computing device may pass this correlated data across concentric boundary 500 to a second edge computing device 300, wherein the second edge computing device 300 may further correlate that other downstream edge computing device(s) 300 are experiencing the same or similar correlated events. This meta-correlation can then be further passed upstream in an iterative fashion until it reaches entity system 200, wherein the correlations between logged events may be recorded in a layered structure (e.g., layer 1 indicating correlations recognized on devices fully downstream, layer 2 indicating meta-correlations recognized on devices one concentric boundary upstream, and so on, for any number of data dops from device to device). In this way, the processing demands for entity system 200 are greatly reduced, while also enhancing the level of detail and usefulness of the logged event data obtained from downstream devices.

In some embodiments, the system may identify occurrence of a high exposure event and may access all log data from the one or more logs, where the extracted log data may be associated with time stamp associated with occurrence of the high exposure event. The system instantly correlates the log data extracted from the one or more logs and identifies critical information associated with the high exposure event.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for correlating event data on electronic data logs for monitored events on a network, the system comprising:
    at least one network communication interface;
    at least one non-transitory storage device; and
    at least one processing device coupled to the at least one non-transitory storage device and the at least one network communication interface, wherein the at least one processing device is configured to:
    continuously monitor stored data on one or more entity resources;
    analyze, via an edge computing device, data from a data repository and determine that a transaction from a specific user account is initiated at or near a time of an encryption event, and log the data as a transaction event;
    identify at least a first event and a second event other than the transaction event associated with at least one entity resource of the one or more entity resources;
    store the first event and the second event in at least a first log and a second log;
    based on metadata of the first event and the second event, correlate the first event and second event to generate a correlated event log;
    receive multiple correlated event logs on an upstream entity resource, wherein the upstream entity resource and a downstream entity resource are defined by concentric boundaries between the upstream entity resource and the downstream entity resource based on a number of data hops between the upstream entity resource and a central network being less than a number of data hops between the downstream entity resource and the central network; and
    perform a meta-correlation of the correlated event logs to generate an upstream correlated event log, wherein the meta-correlation further comprises the edge computing device identifying a correlation of two or more data points or logged events to infer that an additional event has occurred.

2. The system of claim 1, further configured to correlate the first event and second event via use of a dedicated processing device located on the at least one entity resource of the one or more entity resources.

3. The system of claim 1, wherein the upstream correlated event log is generated via use of a dedicated processing device located on the upstream entity resource.

4. The system of claim 1, further configured to receive multiple correlated event logs and upstream correlates event logs at a single centralized database.

5. The system of claim 1, wherein the at least one processing device is configured to:
    create at least a third log to record activities associated with the first log and the second log.

6. The system of claim 1, wherein at least one of the first event and the second event is a high exposure event or resource error.

7. A computer program product for relating event data on electronic data logs for monitored events on a network, the computer program product comprising a non-transitory computer-readable storage medium having computer executable instructions for causing a computer processor to perform the steps of:
    continuously monitoring stored data on one or more entity resources;
    analyzing, via an edge computing device, data from a data repository and determine that a transaction from a specific user account is initiated at or near a time of an encryption event, and log the data as a transaction event;
    identifying at least a first event and a second event other than the transaction event associated with at least one entity resource of the one or more entity resources;
    storing the first event and the second event in at least a first log and a second log;
    based on metadata of the first event and the second event, correlating the first event and second event to generate a correlated event log;
    receiving multiple correlated event logs on an upstream entity resource, wherein the upstream entity resource and a downstream entity resource are defined by concentric boundaries between the upstream entity resource and the downstream entity resource based on a number of data hops between the upstream entity resource and a central network being less than a number of data hops between the downstream entity resource and the central network; and
    performing a meta-correlation of the correlated event logs to generate an upstream correlated event log, wherein the meta-correlation further comprises the edge computing device identifying a correlation of two or more data points or logged events to infer that an additional event has occurred.

8. The computer program product of claim 7, wherein the computer executable instructions cause the computer processor to perform the step of:
correlating the first event and second event via use of a dedicated processing device located on the at least one entity resource of the one or more entity resources.

9. The computer program product of claim 7, wherein the upstream correlated event log is generated via use of a dedicated processing device located on the upstream entity resource.

10. The computer program product of claim 7, wherein the computer executable instructions cause the computer processor to perform the step of:
receiving multiple correlated event logs and upstream correlates event logs at a single centralized database.

11. The computer program product of claim 7, wherein the computer executable instructions cause the computer processor to perform the step of:
creating at least a third log to record activities associated with the first log and the second log.

12. The computer program product of claim 7, wherein at least one of the first event and the second event is a high exposure event or resource error.

13. A computer implemented method for correlating event data on electronic data logs for monitored events on a network, wherein the method comprises:
continuously monitoring stored data on one or more entity resources;
analyzing, via an edge computing device, data from a data repository and determine that a transaction from a specific user account is initiated at or near a time of an encryption event, and log the data as a transaction event;
identifying at least a first event and a second event other than the transaction event associated with at least one entity resource of the one or more entity resources;
storing the first event and the second event in at least a first log and a second log;
based on metadata of the first event and the second event, correlating the first event and second event to generate a correlated event log;
receiving multiple correlated event logs on an upstream entity resource, wherein the upstream entity resource and a downstream entity resource are defined by concentric boundaries between the upstream entity resource and the downstream entity resource based on a number of data hops between the upstream entity resource and a central network being less than a number of data hops between the downstream entity resource and the central network; and
performing a meta-correlation of the correlated event logs to generate an upstream correlated event log, wherein the meta-correlation further comprises the edge computing device identifying a correlation of two or more data points or logged events to infer that an additional event has occurred.

14. The computer implemented method of claim 13, wherein the method further comprises correlating the first event and second event via use of a dedicated processing device located on the at least one entity resource of the one or more entity resources.

15. The computer implemented method of claim 13, wherein the upstream correlated event log is generated via use of a dedicated processing device located on the upstream entity resource.

16. The computer implemented method of claim 13, wherein the method further comprises receiving multiple correlated event logs and upstream correlates event logs at a single centralized database.

17. The computer implemented method of claim 13, wherein the method further comprises creating at least a third log to record activities associated with the first log and the second log.

* * * * *